United States Patent [19]

Miyazaki et al.

[11] Patent Number: 4,873,160

[45] Date of Patent: Oct. 10, 1989

[54] RECHARGEABLE BATTERY

[75] Inventors: Noriyuki Miyazaki; Tetsunori Matsuoka, both of Hyogo, Japan

[73] Assignee: Sanyo Electric Co., Ltd., Japan

[21] Appl. No.: 268,163

[22] Filed: Nov. 7, 1988

[30] Foreign Application Priority Data

Nov. 10, 1987 [JP] Japan .................................. 62-283613

[51] Int. Cl.4 ................................................ H01M 2/6
[52] U.S. Cl. ..................................... 429/170; 429/100;
429/178
[58] Field of Search ................... 429/100, 96, 97, 157, 429/170, 178, 181; 320/2

[56] References Cited

U.S. PATENT DOCUMENTS

| | | | |
|---|---|---|---|
| 2,546,379 | 3/1951 | Woodring et al. | 429/170 |
| 3,684,583 | 8/1972 | Lehnen et al. | 429/100 |
| 3,990,919 | 11/1976 | Krueger | 429/100 |
| 4,057,677 | 11/1977 | Mabuchi | 429/100 |
| 4,489,268 | 12/1984 | Beachy | 320/2 |

FOREIGN PATENT DOCUMENTS 2533075  3/1984  France ............................... 429/178

Primary Examiner—Donald L. Walton
Attorney, Agent, or Firm—Darby & Darby

[57] ABSTRACT

A rechargeable battery comprises an internal cell having a pair of electrodes, an insulated cylindrical case having an internal space for holding the internal cell and end walls provided on both ends thereof and substantially conforming to a prescribed conventional battery in outside dimension, an insulated cover plate having an opening in its center and being provided on one of the end walls of the case, and a first auxiliary terminal having a flange portion held by the said one of the end walls of the case and the cover plate to be supported by the same and a projection protruding from the central opening of the cover plate and being electrically connected to one of the electrodes of the internal cell.

12 Claims, 8 Drawing Sheets

RECHARGEABLE BATTERY

BACKGROUND OF THE INVENTION

1. Field of the Invention

The present invention relates to a rechargeable cell, which is smaller in diameter and height than a general dry cell having standardized dimensions, contained in an insulated case to conform to the general dry cell in size.

2. Description of the Prior Art

U.S. Pat. No. 3,684,583 discloses a rechargeable battery, which is interchangeable in configuration with a general dry cell. This rechargeable battery is formed by a rechargeable cell which is smaller in diameter and height than a general dry cell having standardized dimensions, an insulated cylindrical case and auxiliary terminals.

FIG. 1A is a longitudinal sectional view showing the conventional rechargeable battery disclosed in the above Patent. FIG. 1B is a partially fragmented sectional view of the conventional battery seen from a negative terminal side. FIG. 1C is a plan view of the conventional battery seen from an positive terminal side. Referring to FIG. 1A, a rechargeable cell 1 having smaller dimensions than those of a SUM-1 (D-size) dry cell is provided with a positive terminal 2, to which a first auxiliary terminal 3 formed by a tubular member is rigidly fixed thereby to increase the vertical size. A second auxiliary terminal 5, which is formed by a dished member having a larger diameter than that of the cell 1, is welded to a bottom portion 4 of the cell 1, thereby to increase the radial size.

An end wall 7 is provided on an insulated cylindrical case 6 of plastic. The end wall 7 is provided with an opening 8 for receiving the first auxiliary terminal 3. The other end of the case 6 is closed by the second auxiliary terminal 5.

Referring to FIG. 1B, radial ribs 9 are integrally formed on the inner wall of the case 6, thereby to support the cell 1 in the radial direction.

In such a conventional battery, the first auxiliary terminal 3 is directly mounted on the positive terminal 2 of the cell 1, but not rigidly fixed to the case 6. Therefore, impact or stress applied to the first auxiliary terminal 3 is directly transmitted to the positive terminal 2 of the cell 1. Thus, when such a battery is connected to/-disconnected from a battery charger or a battery housing of a battery-applied device, or the same is thrown down by accident, impact or stress applied to the first auxiliary terminal 3 is directly transmitted to the positive terminal 2 of the cell 1 to exert a bad influence on a safety vent provided on the positive terminal 2, to disable correct maintenance of working pressure of the vent.

FIG. 2 is a longitudinal sectional view showing another conventional rechargeable battery, which contains a plurality of cells. This battery is disclosed in U.S. Pat. No. 4,489,268. Referring to FIG. 2, a cylindrical case 11 contains a plurality of rechargeable cells 12a, 12b and 12c. Conductive plates, which are not shown in FIG. 2, are provided between cell 12a and cell 12b and between cell 12b and cell 12c respectively to connect each other. A positive auxiliary terminal 14 for supplying power is provided on one end of the case 11, while a negative auxiliary terminal 16 is provided on the other end thereof. A charging terminal 13 is provided on a circumferential surface part, which is close to the positive auxiliary terminal 14, of the case 11. A lead member 15 electrically connects the positive terminal of the cell 12a to the positive auxiliary terminal 14 and the charging terminal 13. The positive auxiliary terminal 14 is held by a positive terminal holding part 17. The case 11 is formed by the positive terminal holding part 17, a cylindrical part 18 radially supporting the cells 12a, 12b and 12c and a negative terminal bottom surface part 19 for holding the negative auxiliary terminal 16. The positive terminal holding part 17, the cylindrical part 18 and the negative terminal bottom surface part 19 are formed of insulating resin materials.

The ring-shaped charging terminal 13 is welded to the lead member 15 through an opening 17a defined in the peripheral edge of the positive terminal holding part 17. The positive auxiliary terminal 14 is electrically connected with the lead member 15, to be held by the positive terminal holding part 17 by an eyelet. The negative auxiliary terminal 16 is electrically connected to a negative terminal of the cell 12c by spot welding or the like. The negative auxiliary terminal 16 is inserted in the cylindrical part 18 of resin to adhere the negative terminal bottom surface part 19, having an opening in its center, to the cylindrical part 18 by ultrasonic welding or the like. The positive terminal holding part 17 is also adhered to the cylindrical part 18 by ultrasonic welding or the like.

In this conventional battery, strength for holding the positive auxiliary terminal 14 is insufficient since the positive auxiliary terminal 14 is fixed to the auxiliary terminal holding part 17 by the eyelet. When, for example, the battery is dropped with the positive auxiliary terminal 14 being downwardly directed, force is directly applied to the positive auxiliary terminal 14 to break a part joined by the eyelet. Further, this battery has a large number of components to require a number of steps for assembling, leading to various restrictions.

SUMMARY OF THE INVENTION

An object of the present invention is to provide a rechargeable battery, which has an auxiliary terminal rigidly mounted on a case, and which can be assembled through simple steps.

The inventive rechargeable battery comprises an internal cell having a pair of electrodes, an insulated cylindrical case having an internal space for holding the internal battery and end walls provided on both ends thereof and substantially confirming to a prescribed conventional cell in outside dimension, an insulated cover plate having an opening in its center and provided on one of the end walls of the case, and a first auxiliary terminal having a flange portion held by one of the end walls of the case and the cover plate to be supported by the same and a projection protruding from the central opening of the cover plate, to be electrically connected to one of the electrodes of the internal cell.

In the rechargeable battery according to the present invention, the first auxiliary terminal is supported by one of the end walls of the case and the cover plate through the flange portion held between the same. Thus, an area for supporting the first auxiliary terminal can be increased to rigidly mount the same. When the auxiliary terminal is applied to a positive auxiliary terminal, transmission of external force to the internal cell can be prevented to protect a safety vent against distortion or breakage.

In the rechargeable battery according to the present invention, further, the first auxiliary terminal can be supported through simple structure, thereby to reduce the number of manufacturing steps.

According to the present invention, an inwardly extending bottom wall can be provided in one of the end walls of the case. Such a bottom wall is adapted to increase the area for supporting the first auxiliary terminal, thereby to more rigidly support the first auxiliary terminal.

The rechargeable battery according to the present invention may be provided with a second auxiliary terminal, which is electrically connected to the other electrode of the internal cell.

A cap plate having an opening in its center may be provided on the other end wall of the case. In this case, the second auxiliary terminal or the other electrode of the internal cell protrudes from the opening of the cap plate.

In the rechargeable battery according to the present invention, a charging-dedicated terminal part may be provided on the edge of the flange portion of the first auxiliary terminal to extend along a peripheral surface part of the case. In this case, a step portion may be provided on the peripheral surface part of the case provided with the charging-dedicated terminal part, to receive the same.

In an embodiment according to the present invention, one of the end walls of the case and the cover plate are formed of thermoplastic resin materials, and at least one of the end wall and the cover plate has a projection, and the flange portion of the first auxiliary terminal is provided with through portions engaged with the projection, which are welded to the end wall or the cover plate, thereby to fix the cover plate to the end wall. In this case, the cover plate is preferably fixed to the said one of the end walls by ultrasonic welding. The through portions may be defined by holes or notches.

According to the present invention, the internal battery may be formed by a single cell or a plurality of cells which are connected in series with each other.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
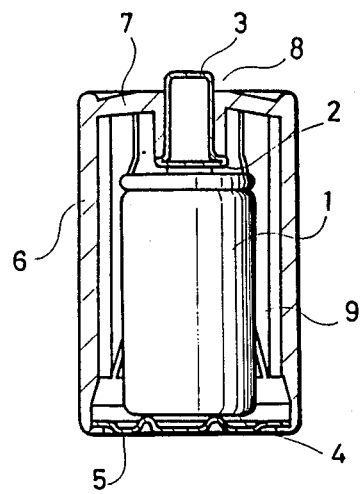
FIG. 1A is a longitudinal sectional view showing an example of a conventional rechargeable battery.
Figure 1B:
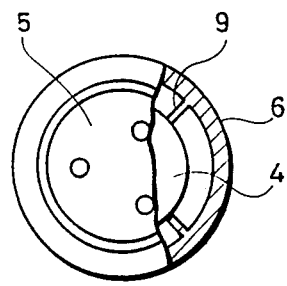
FIG. 1B is a partially fragmented sectional view of the conventional battery seen from a negative terminal side.
Figure 1C:
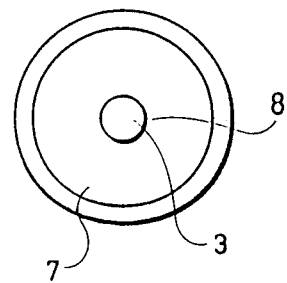
FIG. 1C is a plan view of the conventional battery seen from a positive terminal side.
Figure 2:
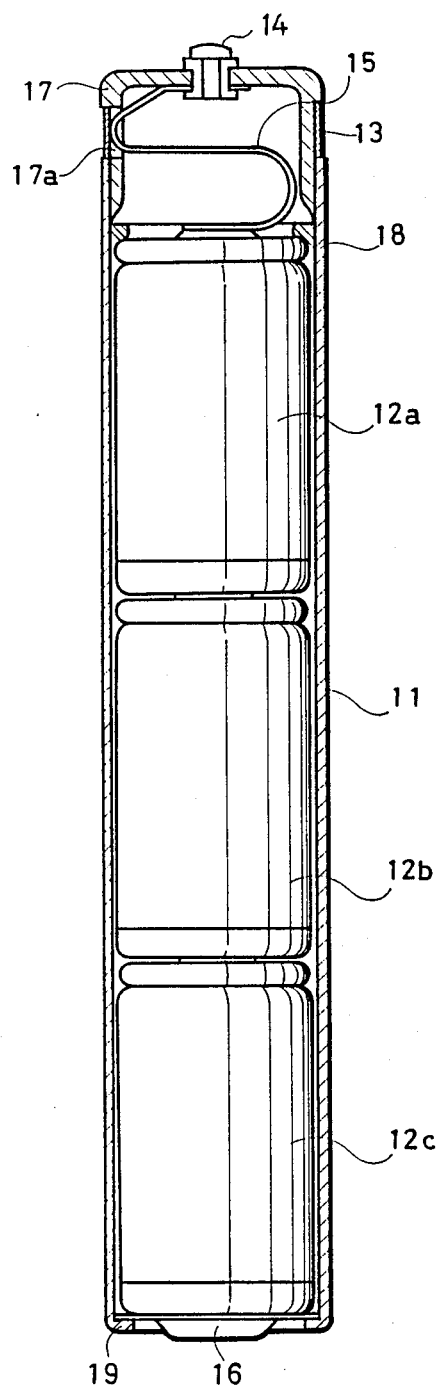
FIG. 2 is a longitudinal sectional view showing another example of a conventional rechargeable battery.
Figure 3:
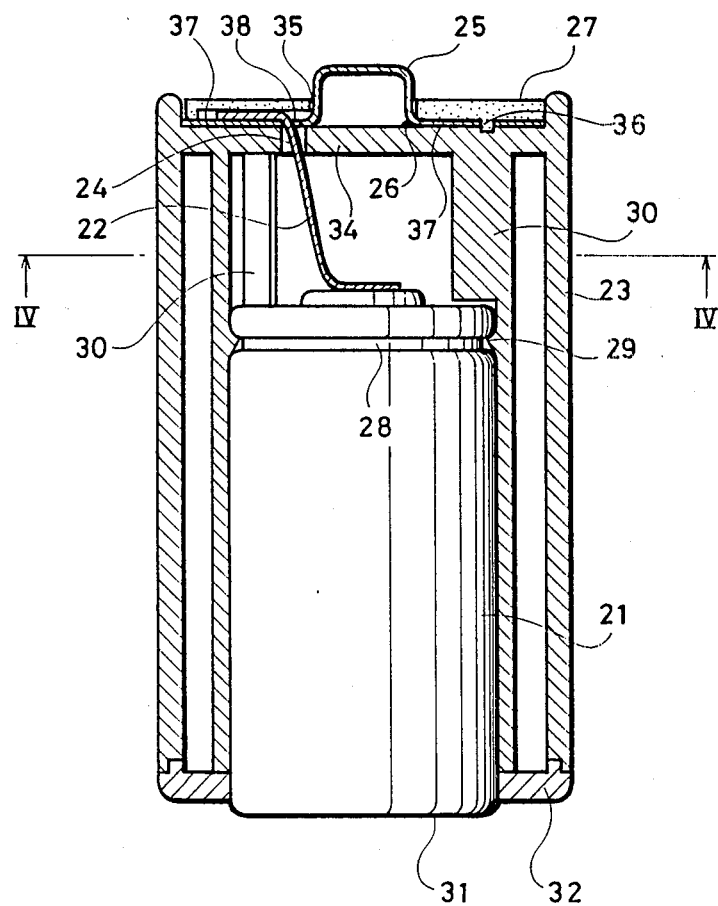
FIG. 3 is a longitudinal sectional view showing a first embodiment according to the present invention.
Figure 4:
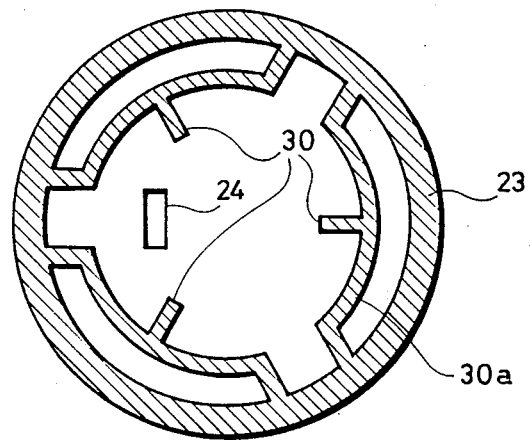
FIG. 4 is a sectional view showing a case of the first embodiment according to the present invention.
Figure 5:
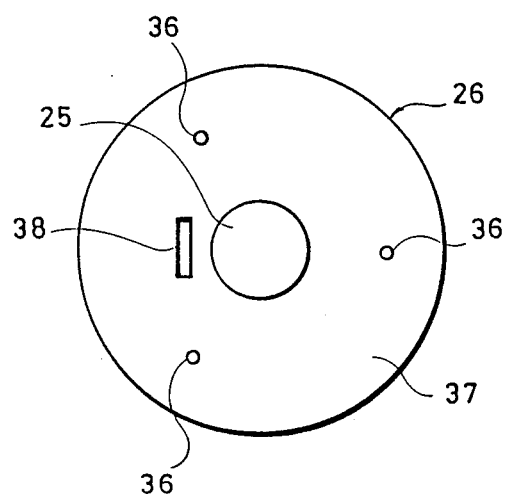
FIG. 5 is a plan view showing a first auxiliary terminal of the first embodiment according to the present invention.

FIG. 3 is a longitudinal sectional view showing a first embodiment according to the present invention. FIG. 4 is a sectional view taken along the line IV—IV in FIG. 3, showing a case 23 employed in the first embodiment. FIG. 5 is a plan view of a first auxiliary terminal 26 employed in the first embodiment.

Referring to FIG. 3, the case 23 contains a cell 21, which is prepared by a rechargeable cell such as a cylindrical closed type nickel-cadmium battery. This cell 21 is 42 mm in height, and 22 mm in diameter. A safety vent is provided on a positive terminal of the cell 21. Further, a lead member 22 is mounted on a positive terminal of the cell 21 by electric welding.

Steps of assembling the first embodiment are now described, to explain the structure thereof.

The cell 21, to which the lead member 22 is welded, is inserted in the case 23 from its opening end portion. The case 23 is provided in a positive terminal side end wall with an inwardly extending bottom wall 34. A first auxiliary terminal 26 is placed on the bottom wall 34. The other end of the lead member 22 is drawn out through a hole 24 formed in the bottom wall 34 and another hole 38 formed in the first auxiliary terminal 26. The said other end of the lead member 22 is fixed to a flange portion 37 of the first auxiliary terminal 26 by electric welding. A projection 25 is formed in the center of the first auxiliary terminal 26. A cover plate 27 is placed on the first auxiliary terminal 26. An opening 35 is defined in the center of the cover plate 27, so that the projection 25 protrudes from the opening 35.

As shown in FIG. 5, the first auxiliary terminal 26 is provided with three through portions 36. For example, projections engageable with the through portions 36 are provided in the cover plate 27, which in turn is placed on the first auxiliary terminal 26 and adhered to the end wall of the case 23 through ultrasonic welding. Thus, the flange portion 37 is held and supported by the cover plate 27 and the end wall of the case 23, thereby to fix the first auxiliary terminal 26. Thickness of the cover plate 27 is about 2 mm, substantially identically to the case 23.

As shown in FIG. 3, the case 23 is provided in its interior with a projection 29, which is engaged with a seam portion 28 formed circumferentially along the cell 21 in proximity to the positive terminal. As shown in FIG. 4, three radial ribs 30 are further provided in the interior of the case 23. The cell 21 is positioned within the case 23 by the radial ribs 30 and the projection 29. The radial ribs 30 are formed on a circular frame 30a, which is provided in the case 23 to extend toward the negative terminal side. This circular frame 30a is adapted to support the cell 21 in the case 23.

A cap plate 32 is provided on a negative terminal-side end wall of the case 23. An opening is defined in the center of the cap plate 32, so that a negative terminal 31 of the cell 21 protrudes from the opening. The cap plate 32 is adhered to the negative terminal-side end wall of the case 23 by ultrasonic welding, for example. The case 23 is identical to a SUM-1 (D-size) cell in diameter, i.e., 34 mm. The height from the upper end of the projection 25 to the lower end of the negative terminal 31 is 60 mm, which is the same as the height of a SUM-1 (D-size) cell. The rechargeable battery including the cell 21 in the case 23 can be employed as a SUM-1 (D-size) battery.

Figure 6:
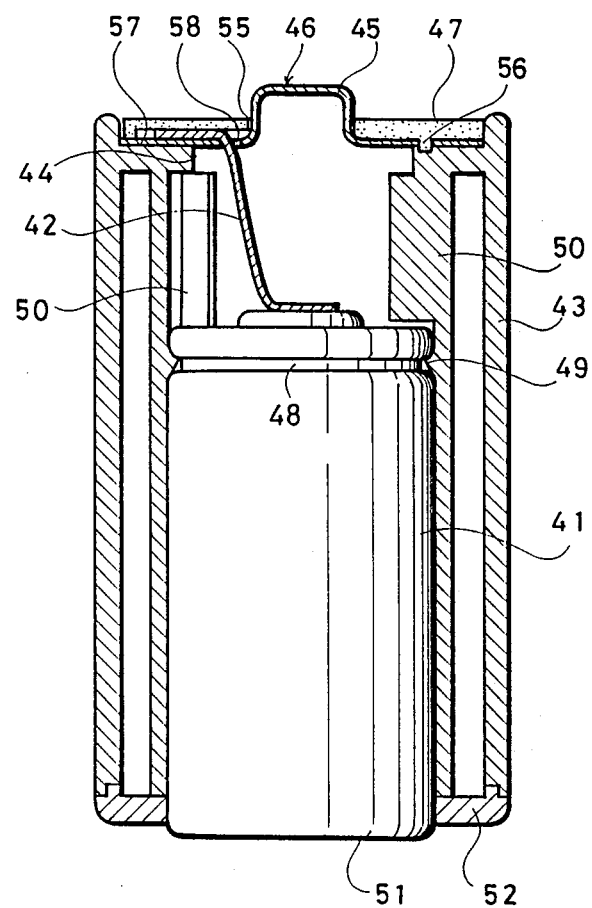
FIG. 6 is a longitudinal sectional view showing a second embodiment according to the present invention.

FIG. 6 is a longitudinal sectional view showing a second embodiment according to the present invention. In this embodiment, no bottom wall is provided but a large opening 44 is defined in a positive terminal-side end wall of a case 43. A cell 41 is positioned within the case 43 by radial ribs 50 and a projection 49. The projection 49 is engaged with a seam portion 48. An end of a lead member 42 is electrically welded to the positive terminal of the cell 41. A first auxiliary terminal 46 is placed on the positive terminal-side end wall of the case 43. The other end of the lead member 42 is electrically welded on a flange portion 57 of the first auxiliary terminal 46 through a hole 58 which is defined in the first auxiliary terminal 46. A cover plate 47 is placed on the first auxiliary terminal 46, to be adhered to the end wall of the case 53 through the projections putting into through portions 56 by ultrasonic welding. A projection 45 protrudes from an opening 55 formed in the center of the cover plate 47.

A cap plate 52 is adhered to/mounted on a negative terminal-side end wall of the case 43 by ultrasonic welding. A negative terminal 51 protrudes from an opening defined in the center of the cap plate 52.

Figure 7:
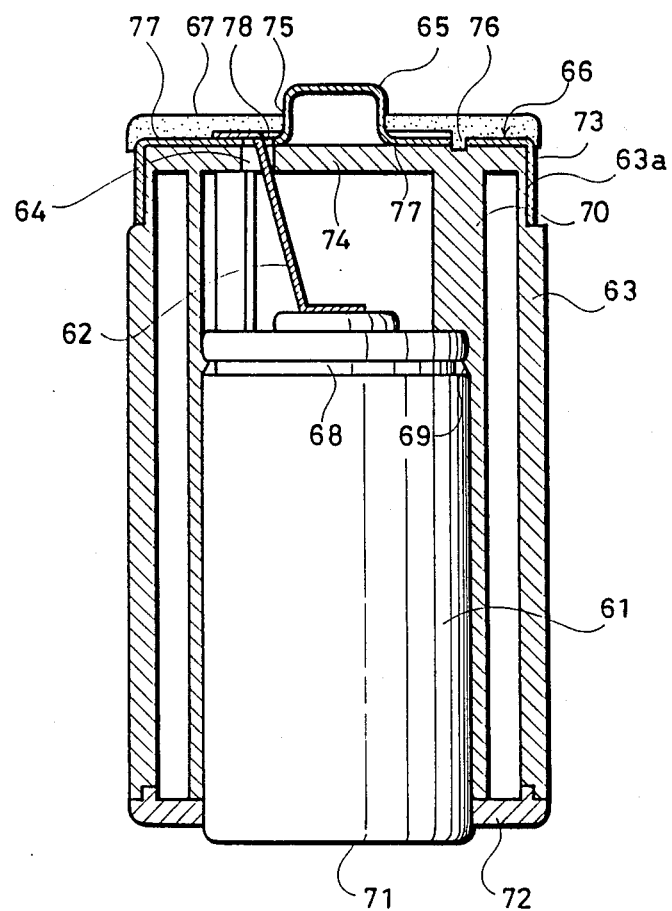
FIG. 7 is a longitudinal sectional view showing a third embodiment according to the present invention.

FIG. 7 is a longitudinal sectional view showing a third embodiment according to the present invention. In this embodiment, a charging terminal 73 is provided on the edge of a first auxiliary terminal 66, to extend along a peripheral surface part of a case 63. A cell 61 is positioned within the case 63 by radial ribs 70 and a projection 69. The projection 69 is engaged with a seam portion 68. An end of a lead member 62 is electrically welded to a positive terminal of the cell 61.

A step portion 63a is provided on a positive terminal side of the case 63, and the first auxiliary terminal 66 is so placed on the case 63 that the charging terminal 73 is fitted with the step portion 63a. The other end of the lead member 62 is electrically welded on a flange portion 77 of the first auxiliary terminal 66 through a hole 64 and another hole 78 defined in the first auxiliary terminal 66. A cover plate 67 is placed on the first auxiliary terminal 66, to be adhered to/mounted on the end wall of the case 63 via through portions 76. A bottom wall 74 inwardly extends from a positive terminal-side end wall. A projection 65 of the first auxiliary terminal 66 protrudes from an opening 75 of the cover plate 67.

A cap plate 72 is adhered to/mounted on a negative terminal-side end wall of the case 63 by ultrasonic welding. A negative terminal 71 of the cell 61 protrudes from a central opening of the cap plate 72.

Figure 8:
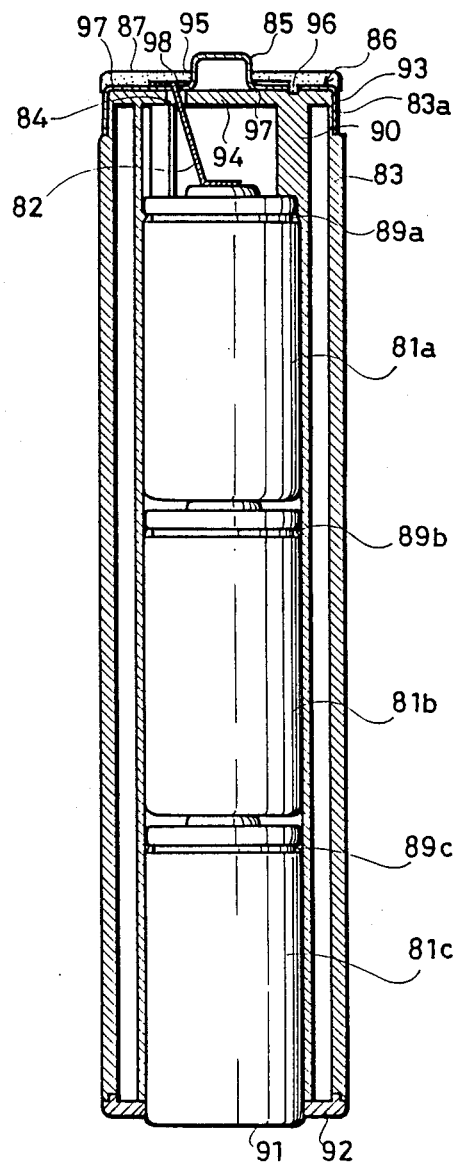
FIG. 8 is a longitudinal sectional view showing a fourth embodiment according to the present invention.

FIG. 8 is a longitudinal sectional view showing a fourth embodiment according to the present invention. In this embodiment, a plurality of cells 81a, 81b and 81c are contained in a case 83 as internal batteries. These cells 81a, 81b and 81c are connected in series with each other. An end of a lead member 82 is electrically welded to the positive terminal of the cell 81a. A step portion 83a is formed in a positive terminal side of the case 83. A first auxiliary terminal 86 is so placed on the case 83 that a charging terminal 93 is fitted with the step portion 83a. The other end of the lead member 82 is mounted on a flange portion 97 of the first auxiliary terminal 86 by electric welding through a hole 84 defined in a bottom wall 94 and another hole 98 defined in the first auxiliary terminal 86.

A cover plate 87 is placed on the first auxiliary terminal 86. The cover plate 87 is adhered to/mounted on the end wall of the case 83 via through portions 96. A projection 85 of the first auxiliary terminal 86 protrudes from a central opening 95 of the cover plate 87. The cells 81a, 81b and 81c are positioned longitudinally within the case 83 by projections 89a, 89b and 89c respectively and are positioned laterally by radial ribs 90.

A cap plate 92 is mounted on a negative terminal-side end wall of the case 83 by ultrasonic welding. A negative terminal 91 of the cell 81c protrudes from a central opening of the cap plate 92. The case 83 is formed by combining two longitudinally divided portions.

Figure 9:
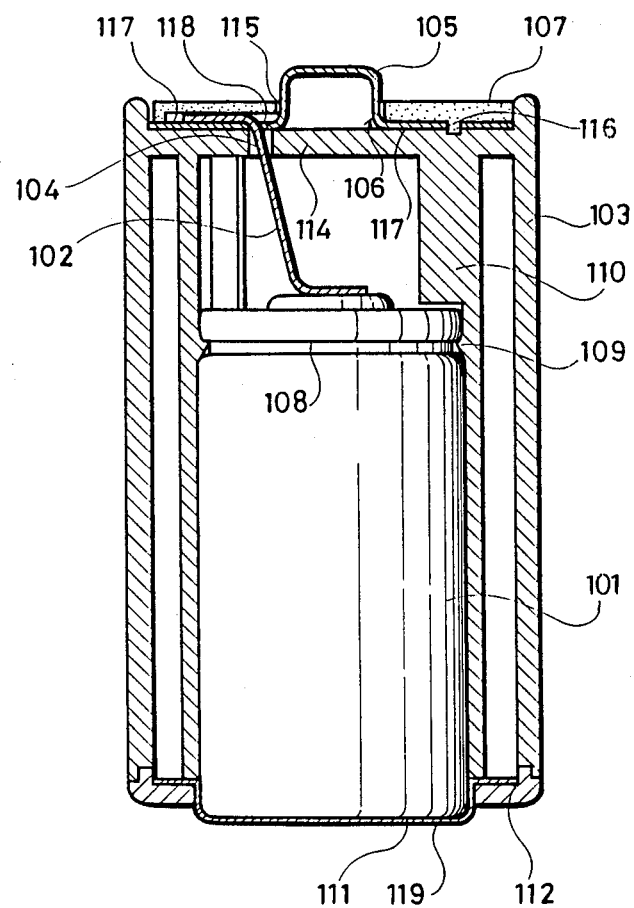
FIG. 9 is a longitudinal sectional view showing a fifth embodiment according to the present invention.

FIG. 9 is a longitudinal sectional view showing a fifth embodiment according to the present invention. In this embodiment, a second auxiliary terminal 119 is electrically connected to the negative terminal of a cell 101. The cell 101 is positioned within a case 103 by radial ribs 110 and a projection 109. The projection 109 is engaged with a seam portion 108. An end of a lead member 102 is electrically welded to the positive terminal of the cell 101. A first auxiliary terminal 106 is placed on a positive terminal-side end wall of the case 103. The other end of the lead member 102 passes through a hole 104 defined in a bottom wall 114 and another hole 118 defined in the first auxiliary terminal 106, to be electrically welded on a flange portion 117 of the first auxiliary terminal 106. A cover plate 107 is placed on the first auxiliary terminal 106. This cover plate 107 is adhered to/mounted on the end wall of the case 103 via through portions 116 by ultrasonic welding. A projection 105 of the first auxiliary terminal 106 protrudes from a central opening 115 of the cover plate 107.

A dished second auxiliary terminal 119 is electrically connected on a negative terminal 111 of the cell 101. A cap plate 112 is provided on the second auxiliary terminal 119, to be adhered to/mounted on a negative terminal-side end wall of the case 103 by ultrasonic welding. The second auxiliary terminal 119 protrudes from a central opening of the cap plate 112.

A dry cell, to which the inventive rechargeable battery is to confirm in size, is not restricted to the SUM-1 (D-size) one or a plurality of the same connected in series with each other, but may be in any generally standardized size.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rechargeable battery comprising:
an internal cell having a pair of electrodes;
an insulated cylindrical case having an internal space for holding said internal cell and end walls provided on both ends thereof, said insulated cylindrical case substantially conforming to a prescribed conventional battery in outside dimension;
an insulated cover plate having an opening in its center and being provided on one of said end walls of said case; and
a first auxiliary terminal having a flange portion held by said one of said end walls of said case and said cover plate to be supported by the same and a projection protruding from said central opening of said cover plate, saif first auxiliary terminal being electrically connected to one of said electrodes of said internal cell.

2. A rechargeable battery in accordance with claim 1, wherein an inwardly extending bottom wall is formed on said one of said end walls of said case.

3. A rechargeable battery in accordance with claim 1, further comprising a second auxiliary terminal which is electrically connected to the other one of said electrodes of said internal cell.

4. A rechargeable battery in accordance with claim 1, further comprising a cap plate having an opening in its center and being provided on other one of said end walls of said case.

5. A rechargeable battery in accordance with claim 4, wherein the other end of said electrodes of said internal cell is held within said case to protrude from said opening of said cap plate.

6. A rechargeable battery in accordance with claim 3, further comprising a cap plate having an opening in its center and being provided on other one of said end walls of said case,
said second auxiliary terminal being provided to protrude from said opening of said cap plate.

7. A rechargeable battery in accordance with claim 1, wherein a charging terminal part is formed on the edge of said flange portion of said first auxiliary terminal to extend along a peripheral surface part of said case.

8. A rechargeable battery in accordance with claim 7, wherein a step portion for receiving said charging terminal part is provided on said peripheral surface part of said case provided with said charging terminal part.

9. A rechargeable battery in accordance with claim 1, wherein said one of said end walls of said case and said cover plate are formed of thermoplastic resin materials, and at least one of said one of end walls and said cover plate has a projection, and said flange portion of said first auxiliary terminal is provided with through portions engaged with said projection, which is welded to said one of said end walls or said cover plate, whereby said cover plate is adhered to/mounted on said one of said end walls.

10. A rechargeable battery in accordance with claim 9, wherein said cover plate is adhered to/mounted on said one of said end walls by ultrasonic welding.

11. A rechargeable battery in accordance with claim 1, wherein said internal cell is single cell.

12. A rechargeable battery in accordance with claim 1, wherein said internal cell comprises a plurality of cells which are connected in series with each other.

* * * * *